Nov. 8, 1966   C. P. SIMMONS   3,283,354
PLUG VALVE FOR FLOW LINES
Filed April 28, 1965
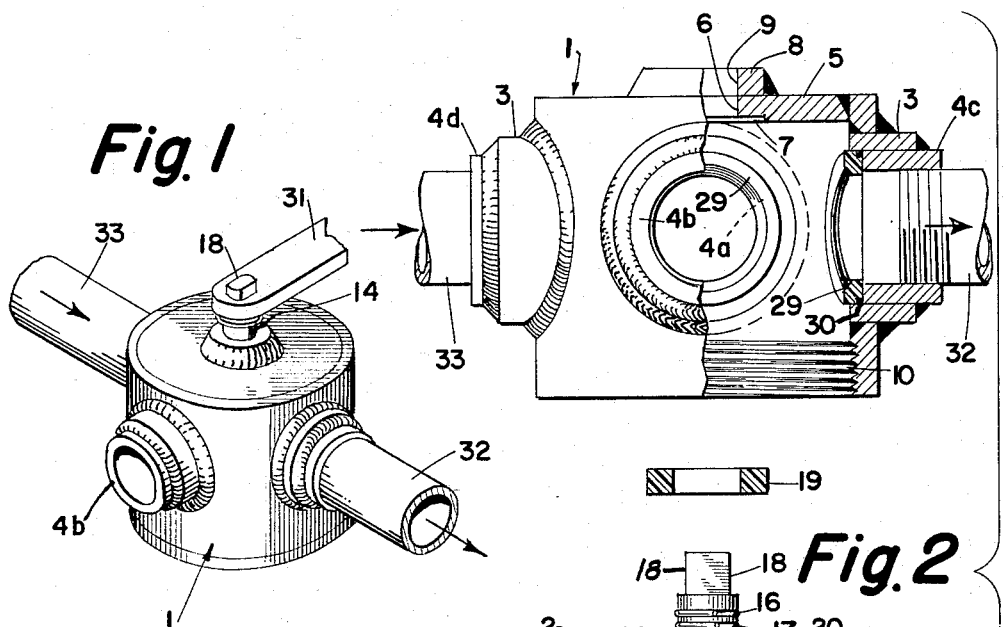
Fig. 1
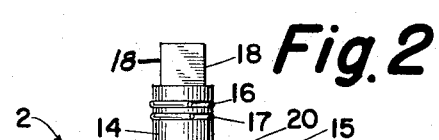
Fig. 2
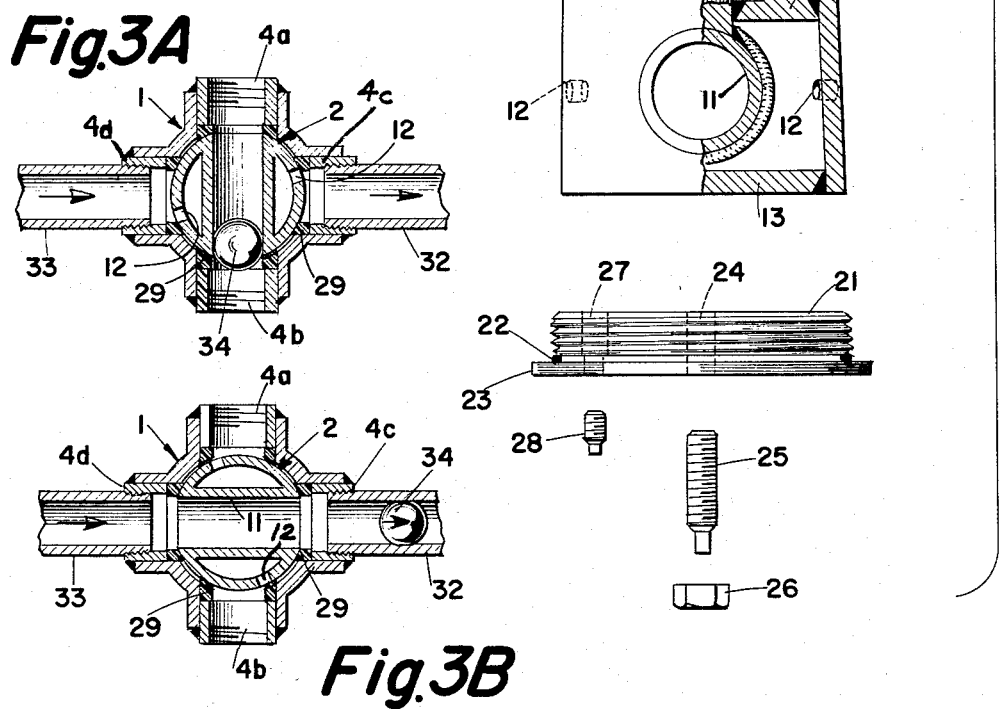
Fig. 3A
Fig. 3B
INVENTOR.
CINCINNATTIAS P. SIMMONS
BY
Donald R. Johnson
ATTORNEY

United States Patent Office 3,283,354
Patented Nov. 8, 1966

3,283,354
PLUG VALVE FOR FLOW LINES
Cincinnattias P. Simmons, Seminole, Tex., assignor to Sun Oil Company, Philadelphia, Pa., a corporation of New Jersey
Filed Apr. 28, 1965, Ser. No. 451,497
3 Claims. (Cl. 15—104.06)

This invention relates to a plug valve for flow lines, such as flow lines carrying crude petroleum.

In active oil fields, pigs, for example spherical bodies (balls) made of hard rubber, are run through the flow lines from the producing wells at regular intervals, usually around once a week, to prevent build-up of paraffin in the flow lines, and eventual plugging of such lines. In the past, this has been done by closing in the well, releasing the pressure, inserting the rubber ball through a clip gate, then opening up the well and allowing the flowing stream of oil to force the ball (pig) down the line to a header at the tank battery, where it is caught in a pig trap.

Occasionally, the paraffin build-up will occur at a faster rate than usual and the flow line will plug up during the running of the pig ball; if this happens, all the tubing pressure of the well is transmitted to the flow line and to the low pressure valves and connections. This constitutes a hazard to the operator who is running the pig.

An object of this invention is to provide a novel plug valve for flow lines.

Another object is to provide a plug valve for flow lines which enables a pig ball to be inserted into the flow line while the well is flowing.

A further object is to provide a plug valve for flow lines, for inserting a pig ball into the flow line, which will withstand the tubing pressure of the well if the flow line plugs up while the pig ball is being run.

A still further object is to provide a plug valve of the type previously described which is relatively simple in design, and therefore fairly inexpensive.

The objects of this invention are accomplished, briefly, in the following manner: An outer hollow cylindrical body has therein two sets of paired diametrically-opposite apertures which extend through the cylindrical wall of the body. One set of these is connected into a flow line when the valve is installed. An inner substantially cylindrical plug body is mounted for rotation within the outer body, this inner body having therein a continuous passage or port which extends in a direction perpendicular to the longitudinal axis of the cylinder. The inner body is rotatable with respect to the outer body to various angular positions, in a first of which the passage in the inner body is aligned with the set of outer body apertures connected to the flow line, and in a second of which the inner body passage is aligned with the other set of outer body apertures. The inner body or plug is hollow save for the passage previously mentioned, and the inner body has ports therein for permitting flow to be maintained through the flow line when the plug valve is in the aforesaid second position. In still another angular position, the plug valve is completely closed.

A detailed description of the invention follows, taken in conjunction with thhe accompanying drawing, wherein:

FIG. 1 is an isometric view of an assembled valve according to this invention, connected into a flow line;

FIG. 2 is an exploded view of the valve, partly in section; and

FIGS. 3A and 3B are somewhat simplified sections of the valve, illustrating two different positions thereof.

Referring now to the drawings, the plug valve of this invention includes a hollow outer body of cylindrical configuration, denoted generally by numeral 1, and an inner substantially cylindrical plug body, denoted generally by numeral 2.

By way of example, the cylindrical wall of the outer body 1 may be formed from a 5¾" casing collar or casing coupling. Four holes are drilled through the cylindrical wall of the casing collar, these holes being 90° apart around the wall and the center lines of all of these holes lying in a common plane. A short length of heavy pipe 3 is placed in each of these holes and welded inside and out, and threaded female fittings 4a–4d, for example 2" steel pipe couplings, are welded one inside each of the respective pipes 3. Thus, there are provided (by means of the four combinations of items 3, 4) two sets of paired diametrically-opposite apertures in the outer body 1, one set being represented by the pair of fittings 4a and 4b, and the other set being represented by the pair of fittings 4c and 4d. Specifically, each set of paired apertures is at 90° to the other set, and one aperture of each pair is aligned with the other aperture of the same pair.

When the valve of this invention is installed in a flow line, as illustrated in FIG. 1, the fittings 4c and 4d are connected to a flow line; specifically, fitting 4c is connected to one end 32 of a flow line, and fitting 4d is connected to the adjacent end 33 of the flow line. The valve of this invention is installed downstream of the choke bean in the flow line 33, 32. This leaves the fittings 4a and 4b free and unconnected, for insertion of a pig ball 34, in a manner which will be explained hereinafter.

An upper plate 5, in the form of a disc or solid cylinder, is welded into one end of the body 1. This upper plate has a central bore 6 for reception of a valve stem 14, to be later described, and also has, in its lower face, a central annular recess or groove 7 for reception of a spacer washer 19, also to be later described. A boss 8, preferably of the same thickness as plate 5 and having therein a central bore 9 of the same diameter as bore 6 and aligned therewith, is welded to the central region of the upper face of plate 5.

In order to enable threaded attachment of a base plate 21 to the bottom body 1, a set of straight threads 10 is cut on the inside of body 1, at the lower end thereof (which is the end opposite the plate 5).

The cylindrical wall of the inner plug body 2 may be formed from a 5¾" nipple, by way of example. Two 2" holes are drilled through the cylindrical wall of the nipple, 180° apart, the center lines of these two holes lying in the same plane. A 2" nipple 11, having a length sufficient to extend entirely through the inner body 2 in a direction perpendicular to the longitudinal axis of the cylinder, is fitted into the 2" holes just mentioned and is welded inside the 5¾" nipple. Thus, nipple 11 provides a continuous, uninterrupted transverse passage entirely through the body 2; in other words, a separate transverse port is provided through the plug body 2.

The inner plug body 2 is hollow save for the passage formed by nipple 11, and two smaller holes 12 (⅜" in diameter, for example) are drilled through the cylindrical wall of this plug body, 180° apart, the center lines of holes 12 lying in the same plane as the axis of nipple 11. However, the center lines of holes 12 are not 90° away from the axis of nipple 11; rather, the small holes 12 are offset 1¾₁₆" to the right from the 90° locations, for a reason which will be explained hereinafter. The holes 12 provide a bleed or bypass for the flow line when the valve is operated to a position suitable for enabling a pig ball to be inserted into nipple 11 from outside the valve, as will be subsequently described.

A bottom plate 13, in the form of a disc or solid cylinder, is welded into one end of the body 2. The length of body 2 is such that there is ½" of clearance between the inside face of plate 13 and the O.D. of nipple 11, at the bottom of the latter.

An upstanding cylindrical valve stem 14, whose axis extends at right angles to the axis of nipple 11, is rigidly secured, as by welding, to the outer surface of nipple 11, centrally of the length thereof and on the opposite side thereof from bottom plate 13. Valve stem 14 is welded through a central hole provided in an upper cylindrical plate 15 which in turn is welded into the end of body 2 opposite to plate 13. There is ½" of clearance between the inside face of plate 15 and the exposed O.D. of nipple 11, at the top of the latter. Above upper plate 15, stem 14 has therein two spaced square-cornered grooves, in which are mounted upper and lower O-rings 16 and 17, respectively. At its upper end, stem 14 has two oppositely-disposed flattened surfaces 18, to which a wrench of operating handle 31 (see FIG. 1) may be applied for manual rotation of stem 14 (and also of plug body 2) when desired.

The inner plug body 2 is mounted for rotation within the outer body 1. For this purpose, a small clearance (e.g., ⅛") is provided between the outside of the plug 2 and the inside of the outer body 1. Before insertion into the outer body 1, however, the plug 2 is machined to a smooth finish on the outside, with a small taper (e.g., ¹⁄₁₆" or ³⁄₃₂") outwardly from top to bottom; that is to say, the outer (cylindrical) surface of the plug 2 is tapered in diameter, the outside diameter at the top of the plug (at plate 15) being slightly smaller than the outside diameter at the bottom of the plug (at plate 13). To maintain the required clearance (e.g., ⅛") between the plug 2 and the outer body 1 at the top of the plug, a spacer washer 19 is utilized. Washer 19 is preferably made of the synthetic polymeric material known as "Teflon" (a polymerized tetrafluoroethylene resin), and fits around the stem 14. A central annular recess 20 which, like recess 7, is ¹⁄₁₆" deep, is provided in the upper face of plate 15. Washer 19, which is ¼" thick, seats in recesses 20 and 7 and fits around stem 14, when plug 2 is assembled in outer body 1. When plug 2 is mounted in outer body 1, stem 14 passes through the aligned bores 6 and 9, and the upper end of this stem (i.e., the end thereof having the flattened surfaces 18) projects above the top of boss 8. Thus, a wrench or operating handle 31 may be applied to these flattened surfaces to rotate stem 14 (and also plug 2, to which the valve stem 14 is secured), as desired for operation of valve. This will be described further hereinafter. The O-rings 16 and 17 engage the wall of bore 9 to provide a seal around stem 14.

A base plate 21, of generally cylindrical shape, closes the bottom end of the outer body 1 and provides a means whereby the plug 2 may be adjusted vertically within the outer body, so as to properly seat the spacer washer 19 in its recesses. Base plate 21 has a length of straight threads cut in its outer surface, which match the threads 10 in body 1. Plate 21 also has, below its threads, a groove in which is positioned a sealing O-ring 22, and has, below the O-ring, a lip or flange 23 to provide a proper seal when plate 21 is screwed up tight.

A centrally-located hole 24 is drilled and tapped in the base plate 21, and a plug adjusting bolt or plug seating bolt 25 threads into this hole so that the shank end of the bolt comes into engagement with the lower face of the plug bottom plate 13. Thus, by screwing bolt 25 in or out, plug 2 may be vertically adjusted within outer body 1, to properly seat spacer washer 19 and to properly vertically position plug 2 in body 1. When plug 2 is properly positioned in outer body 1, the longitudinal axis of nipple 11 and the center lines of holes 12 lie in the same plane as the center lines of the outer body holes (in which are inserted items 3 and 4a–4d). A locking nut 26 threadedly engages bolt 25; this nut may be screwed up tightly against the lower face of plate 21, to lock bolt 25 in an adjusted position.

A hole 27 is drilled through plate 21, the outer end portion of this hole being tapped to enable insertion therein of a threaded bleeder plug or drain plug 28.

To provide seals around the inner plug body 2, four substantially identical annular valve seats 29 are used, one at each of the four fittings 4a–4d in the outer body 1, these seats being of course put into place before the plug body 2 is mounted in the outer body 1. These valve seats are made of a suitable material such as nylon or "Teflon," and each has a 2" central hole therein, which becomes aligned with the bore of its respective fitting 4a–4d when the seat is in position, abutting the inner end of its respective fitting. As just stated, one face of each valve seat 29 abuts the inner end of its respective fitting 4a–4d; this outer face of each seat is substantially planar and has a groove cut therein at its periphery, in which is mounted an O-ring 30. Each O-ring 30 seals against the inner wall of the respective pipe 3 and the inner end of the respective fitting 4a–4d. The inner face of each valve seat 29 is cut to the same diameter as the O.D. of plug body 2, and the inner face of each valve seat has the same taper as does the O.D. of plug 2.

The fittings 4a–4d do not extend as far inwardly as do the pieces of pipe 3, so that a recessed space is provided within pipe 3, inwardly of the end of each respective fitting 4a–4d, for the respective valve seats 29. After each valve seat 29 has been fabricated, it is placed in its respective recessed space, and wedged tightly in place.

The mode of operation of the valve of this invention will now be explained. Assume that the regular or normal flowing position of the valve (and specifically of plug 2) is one wherein the continuous uninterrupted passage (in plug 2) provided by nipple 11 is aligned with the pair of apertures (in outer body 1) represented by fittings 4c and 4d. As previously described, the paired fittings 4c and 4d are coupled into the flow line 33, 32; the "normal flowing" position of plug 2 is the one illustrated in FIGURE 3B. In this position, the bore of nipple 11 forms a continuation of the flow line 33, 32.

When it is desired to run a pig ball 34 through the flow line 33, 32 in order to rid the latter of paraffin deposits, a suitable wrench or operating handle 31 (see FIG. 1) is applied to the flattened surfaces 18 at the upper end of stem 14, and stem 14 (and also, of course, plug 2, which is rigidly fastened thereto) is turned ¼ of a turn (90°) to the left (i.e., in the counterclockwise direction as viewed from above the valve). This 90° rotation of plug 2 relative to outer body 1 brings the bore of nipple 11 into alignment with the pair of outer body apertures represented by fittings 4a and 4b. This latter valve position is illustrated in FIG. 3A. This movement of plug 2 also brings the holes 12 into communication with the pair of outer body apertures represented by fittings 4c and 4d (which are coupled into the flow line 33, 32). In this latter valve position, flow can continue to take place from the flow line end 33 into one hole 12, through the hollow interior of plug 2 around the outside of nipple 11, then through the opposite hole 12 back into the flow line end 32. This means, then, that in this valve position a flow-around effect is provided by the holes 12, and the flow from the well is not interrupted.

In this latter or "ball-inserting" position (FIG. 3A) of the valve, wherein nipple 11 is aligned with the two fittings 4a and 4b, the pig ball 34 (which may be, for example, a hard rubber ball about two inches in diameter) may be inserted through either one of the fittings 4a or 4b, and then pushed into the bore of nipple 11. This is illustrated in FIG. 3A.

After the pig ball 34 has been positioned in nipple 11, handle 31 is turned back ¼ of a turn (90°) to the right (i.e., in the clockwise direction as viewed from above the valve). This rotates the plug 2 to bring the valve back into the normal flowing position (illustrated in FIG. 3B), wherein the bore of nipple 11 is aligned with the flow line 33, 32. Then, the well pressure, acting through the flow line 33, 32, forces the pig ball 34 down the flow line, as illustrated in FIG. 3B. The pig ball 34 then functions to rid the flow line of paraffin deposits, as desired. From here on, the procedure is conventional. The pig ball travels down the flow line to a header at the tank battery, where it is caught in a plug trap.

As previously described, during insertion of the pig ball by means of the plug valve of this invention, the well continues to flow through the flow line 33, 32, the holes 12, and the hollow interior of plug 2. As stated hereinabove, the center lines of holes 12 are not 90° away from the axis of nipple 11, but instead, these holes are offset from the 90° locations. The holes 12 are 180° apart from each other, however. This offsetting of holes 12 from the 90° locations is done so that, as the plug 2 is rotated from the position of FIG. 3B to the position of FIG. 3A (in order to insert a pig ball in the nipple 11), and then back again (in order to cause the pig ball to travel down the flow line), there will be no appreciable interval during which the flow line is closed, either the holes 12 or the bore of nipple 11 communicating with the flow line 33, 32 at all times. That is to say (with the described offset location of holes 12), when rotating plug 2 from the position of FIG. 3B to the position of FIG. 3A, just as the bore of nipple 11 becomes sealed off from the fittings 4c and 4d, the holes 12 come into communication with these same fittings; when rotating plug 2 from the position of FIG. 3A to the position of FIG. 3B, just as holes 12 become sealed off from fittings 4c and 4d, the bore of nipple 11 comes into communication with these same fittings. The offset location of holes 12 also enables the valve to be completely closed, when desired.

To close the valve of this invention completely, the operating handle 31 (and also, of course, the plug 2) is turned ⅛ of a turn (45°) to the right (i.e., in the clockwise direction as viewed from above the valve) from the "normal flowing" position of FIG. 3B. This brings the bore of nipple 11, and also the holes 12, to angular positions wherein they are sealed off from all of the fittings 4a–4d.

One reason for using four seats 29 and four apertures (represented by the four fittings 4a, 4b, 4c, and 4d) in the outer body 1 is to balance the plug 2 from all sides when pressure is applied; another reason is to enable the operator to remove a pig ball which he has inserted, but which he needs to thereafter remove, for some reason.

In connection with this latter statement, when the plug 2 is in the FIG. 3A position, if a pig ball 34 has been pushed into the bore of nipple 11 via fitting 4a it can be pushed on through and removed via fitting 4b, or it can be pushed back from the fitting 4b side of the valve and removed via fitting 4a.

The items 3 and 4 provide high pressure connections for the valve of the invention. When utilizing the valve described herein, all standard connections and low pressure valves used in the prior pig ball running procedure are removed. It may be noted that the plug 2 is rotatable through 360°, simplifying the installation.

The invention claimed is:

1. A rotatable plug valve for flow lines comprising an outer hollow body of generally cylindrical configuration having two sets of paired diametrically-opposite apertures extending through its cylindrical wall, the center lines of all of said apertures lying substantially in a common plane; an inner substantially cylindrical hollow plug body mounted for rotation within said outer body, an imperforate pipe extending entirely through said inner body in a direction perpendicular to the longitudinal axis of the cylinder and sealed through the cylindrical wall thereof, the bore of said pipe providing through said inner body a continuous, uninterrupted passage whose center line lies substantially in said plane when said valve is assembled; and means for rotating said inner body with respect to said outer body to various angular positions, in a first of which said passage is aligned with one set of diametrically-opposite apertures in said outer body and in a second of which said passage is aligned with the other set of diametrically-opposite apertures in said outer body; the cylindrical wall of said inner body having therein a pair of diametrically-opposite apertures so located that when said inner body is in said first angular position, the two apertures in said inner body communicate respectively with the two apertures in said other set of outer body apertures.

2. Plug valve in accordance with claim 1, wherein said other set of apertures is connected into a flow line, thereby causing the two apertures in said inner body to communicate with said flow line when said inner body is in said first angular position.

3. Plug valve according to claim 2, wherein the four apertures in said outer body are orthogonally related.

References Cited by the Examiner
UNITED STATES PATENTS

| | | | |
|---|---|---|---|
| 616,696 | 12/1898 | Cochran | 15—104.06 X |
| 2,786,219 | 3/1957 | Meyer | 15—104.06 |
| 3,177,513 | 4/1965 | Ellett | 12—104.06 |

CHARLES A. WILLMUTH, *Primary Examiner.*
E. L. ROBERTS, *Assistant Examiner.*